(12) United States Patent
Sarcar et al.

(10) Patent No.: US 9,378,036 B1
(45) Date of Patent: Jun. 28, 2016

(54) METHOD AND SYSTEM FOR COMMUNICATION IN A VIRTUAL MACHINE ENVIRONMENT

(71) Applicant: QLOGIC, Corporation, Aliso Viejo, CA (US)

(72) Inventors: Kanoj Sarcar, Fremont, CA (US); Winnie Yu, San Jose, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 185 days.

(21) Appl. No.: 14/166,082

(22) Filed: Jan. 28, 2014

(51) Int. Cl.
*G06F 9/455* (2006.01)
*H04L 12/931* (2013.01)
*H04L 12/935* (2013.01)

(52) U.S. Cl.
CPC ............ *G06F 9/45533* (2013.01); *H04L 49/00* (2013.01); *H04L 49/3045* (2013.01)

(58) Field of Classification Search
None
See application file for complete search history.

(56) References Cited

U.S. PATENT DOCUMENTS

| 2012/0027017 A1* | 2/2012 | Rai | H04L 12/18 370/392 |
| 2014/0331221 A1* | 11/2014 | Dong | H04L 45/00 718/1 |

* cited by examiner

*Primary Examiner* — Emerson Puente
*Assistant Examiner* — Jonathan R Labud
(74) *Attorney, Agent, or Firm* — Klein, O'Neill & Singh, LLP (57) ABSTRACT

Methods and systems for routing frames are provided. A routing module of a network device stores a destination address for a virtual machine with a virtual bridge identifier associated with a virtual bridge. The virtual bridge identifier is associated with a queue pair that is used by the virtual machine to send and receive information using the virtual bridge. The network device also includes a port connected to a link for sending and receiving the information and the virtual bridge is associated with the port. The routing module is used to determine the destination of a frame whether the frame is sent by an external device or the virtual machine.

21 Claims, 12 Drawing Sheets

VM Instantiation

METHOD AND SYSTEM FOR COMMUNICATION IN A VIRTUAL MACHINE ENVIRONMENT

TECHNICAL FIELD

The present disclosure relates to communication in a virtual machine environment.

BACKGROUND

Virtual machines are commonly used today. Virtual machines share physical resources, including adapters, storage and other devices. Virtual machines may communicate with each other and continuous efforts are being made to improve such communication.

BRIEF DESCRIPTION OF THE DRAWINGS

The various embodiments relating to facilitating communication between devices in a network now will be discussed in detail with an emphasis on highlighting the advantageous features. These novel and non-obvious embodiments are shown in the accompanying drawings, which are for illustrative purposes only. These drawings include the following figures, in which like numerals indicate like parts:

FIGS. 3-8A/8B show various process flow diagrams, according to the various embodiments of the present disclosure.

DETAILED DESCRIPTION

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry) or a combination of these implementations. The terms "logic", "module", "component", "system", and "functionality", as used herein, generally represent software, firmware, hardware, or a combination of these elements. For instance, in the case of a software implementation, the terms "logic", "module", "component", "system", and "functionality" represent program code that performs specified tasks when executed on a hardware processing device or devices (e.g., CPU or CPUs). The program code can be stored in one or more non-transitory computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of non-transitory storage medium for retaining information in any form, including various kinds of storage devices (magnetic, optical, static, etc.).

The embodiments disclosed herein, may be implemented as a computer process (method), a computing system, or as an article of manufacture, such as a computer program product or computer-readable media. The computer program product may be non-transitory computer storage media, readable by a computer device, and encoding a computer program of instructions for executing a computer process.

Figure 1A:
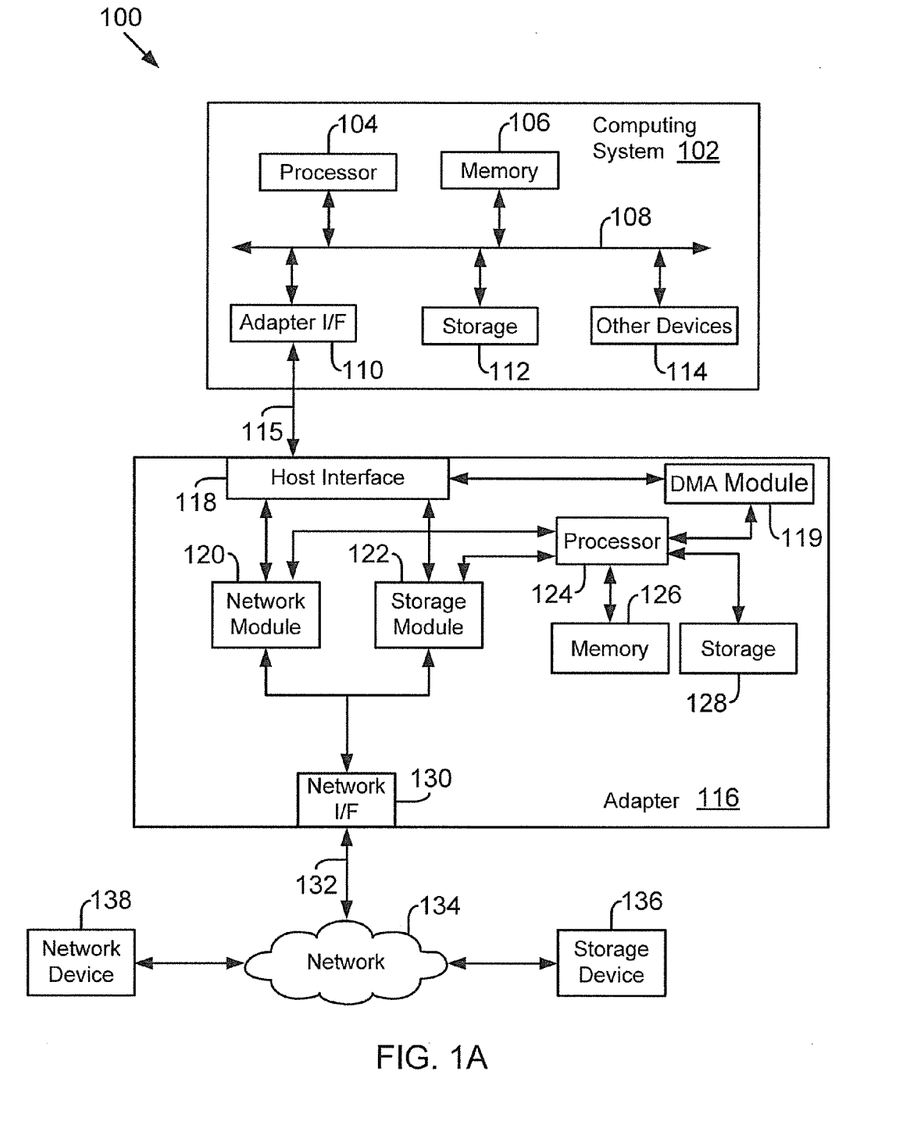
FIG. 1A is a functional block diagram of a computing system coupled to a network through an adapter.

FIG. 1A is a block diagram of a system 100 configured for use with the present embodiments. The system 100 may include one or more computing system 102 (may also be referred to as "host system 102" or server 102) coupled to another device via a link 115, for example, an adapter 116 that interfaces with a network 134. The network 134 may include, for example, additional computing systems, servers, storage systems, etc. It is noteworthy that although the description below is based on the interaction between adapter 116 and host system 102, the embodiments disclosed herein are not limited to any particular adapter type or peripheral device type.

The computing system 102 may include one or more processors 104, also known as a central processing unit (CPU). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

The processor 104 executes computer-executable process steps and interfaces with an interconnect (or computer bus) 108. The computer bus 108 may be, for example, a system bus, a Peripheral Component Interconnect (PCI) bus (or a PCI-Express bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other interconnect type.

An adapter interface 110 interfaces with the adapter 116 via the link 115 for sending and receiving information. Link 115 may be an interconnect system, for example, a PCI-Express link. The computing system 102 also includes other devices and interfaces 114, which may include a display device interface, a keyboard interface, a pointing device interface, etc.

The computing system 102 may further include a storage device 112, which may be for example a hard disk, a CD-ROM, a non-volatile memory device (flash or memory stick) or any other mass storage device. Storage device 112 may store operating system program files, application program files, and other files. Some of these files are stored on storage device 112 using an installation program. For example, the processor 104 may execute computer-executable process steps of an installation program so that the processor 104 can properly execute the application program.

Memory 106 also interfaces to the computer bus 108 to provide the processor 104 with access to memory storage.

Memory 106 may include random access main memory (RAM). When executing stored computer-executable process steps from storage 112, the processor 104 may store and execute the process steps out of RAM. Read only memory (ROM, not shown) may also be used to store invariant instruction sequences, such as start-up instruction sequences or basic input/output system (BIOS) sequences for operation of a keyboard (not shown).

With continued reference to FIG. 1A, link 115 and the adapter interface 110 couple the adapter 116 to the computing system 102. The adapter 116 may be configured to handle both network and storage traffic. Various network and storage protocols may be used to handle network and storage traffic. Some of the common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates greater 100 Mbps. The descriptions of the various embodiments described herein are based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

One common storage protocol used to access storage systems is Fibre Channel (FC). Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches computing systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

A new and upcoming standard, called Fibre Channel over Ethernet (FCOE) has been developed to handle both Ethernet and Fibre Channel traffic in a storage area network (SAN). This functionality would allow Fibre Channel to leverage high speed networks (for example, 10 Gigabit Ethernet networks) while preserving the Fibre Channel protocol. The adapter 116 shown in FIG. 1A may be configured to operate as an FCOE adapter and may be referred to as FCOE adapter 116. The illustrated adapter 116, however, does not limit the scope of the present embodiments. The present embodiments may be practiced with adapters having different configurations.

Referring back to FIG. 1A, adapter 116 interfaces with the computing system 102 via the link 115 and a host interface 118. The adapter 116 may include a processor 124 that executes firmware instructions out of a memory 126 to control overall adapter operations. The adapter 116 may also include storage 128, which may be for example non-volatile memory, such as flash memory, or any other device. The storage 128 may store executable instructions and operating parameters that can be used for controlling adapter operations.

The adapter 116 includes a network module 120 for handling network traffic via a link 132. In one embodiment, the network module 120 includes logic and circuitry for handling network packets, for example, Ethernet or any other type of network packets. The network module 120 may include memory buffers (not shown) to temporarily store information received from other network devices 138 and transmitted to other network devices 138.

The adapter 116 may also include a storage module 122 for handling storage traffic to and from storage devices 136. The storage module 122 may further include memory buffers (not shown) to temporarily store information received from the storage devices 136 and transmitted by the adapter 116 to the storage devices 136. In one embodiment, the storage module 122 is configured to process storage traffic according to the Fibre Channel storage protocol, or any other protocol. It is noteworthy that adapter 116 may only have a network module 120 or a storage module 122. The embodiments described herein are not limited to any particular adapter type.

The adapter 116 also includes a network interface 130 that interfaces with link 132 via one or more ports (not shown). The network interface 130 includes logic and circuitry to receive information via the network link 132 and pass it to either the network module 120 or the storage module 122, depending on the packet type.

Adapter 116 also includes a direct memory access (DMA) module 119 that is used to manage access to link 115. The DMA module 119 uses a plurality of DMA channels for transferring data via link 115. The DMA channels are typically used to move control structures such as input/output control blocks (IOCBs), input/output status blocks (IOSBs) and data between host system memory 106 and the adapter memory 126.

Figure 1B:
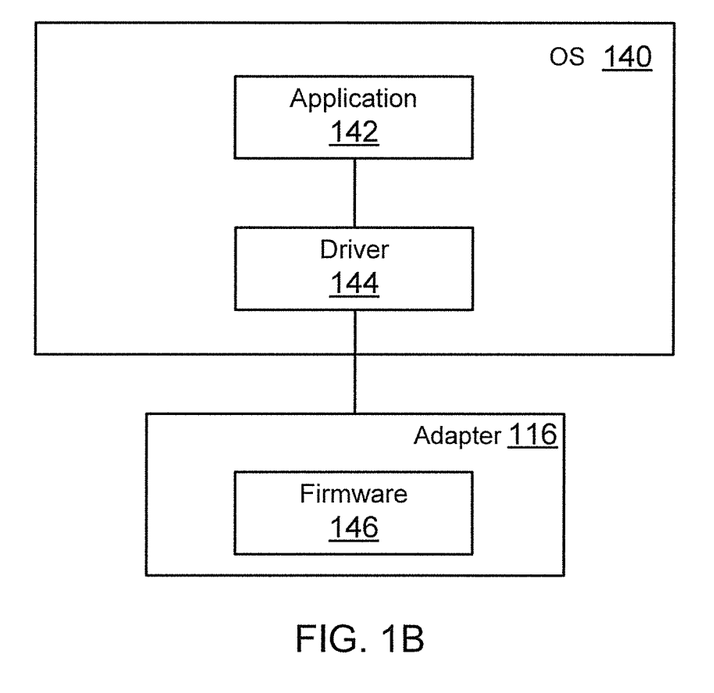
FIG. 1B shows a block diagram of a generic architecture used by the system of FIG. 1A.

FIG. 1B shows an example of a generic software architecture used by system 100. Processor 104 executes an operating system 140 for controlling the overall operations of computing system 102. The operating system may be Windows based, Linux operating system, Solaris, or any other operating system type. The embodiments disclosed herein are not limited to any particular operating system type.

An application 142 may be executed by processor 104 for performing certain functions. For example, application 142 may be an email program, a database application or any other application type. Application 142 may send a command to a driver 144 for performing an operation, for example, reading and/or writing data (input/output (I/O) at another storage device. The driver 144 processes the request and communicates with firmware 146 executed by processor 124 of adapter 116. A component of adapter 116 then processes the request.

Figure 2A:
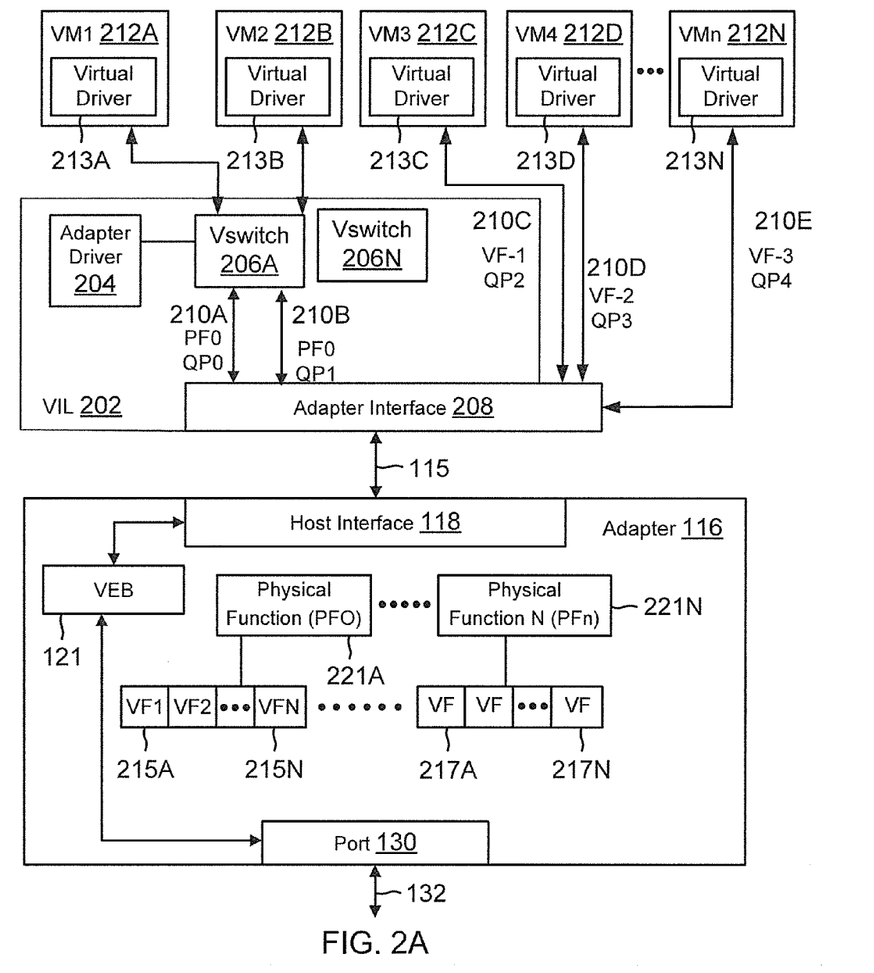
FIG. 2A shows a virtual environment using virtual machines, according to one embodiment.

FIG. 2A shows a block diagram of a virtual environment 200 according to an embodiment of the current disclosure. Virtual environment 200 includes a virtual interface layer (VIL) 202 that is coupled to adapter 116 (or any other physical hardware resource) via link 115. Adapter 116 may be used to facilitate input/output communications for reading and writing information at a storage device and/or for communicating with another device via port 130 via link 132. Virtualization of the physical hardware resources at adapter 116 may be supported by single-root input/output virtualization (SR-IOV) as specified by the standard PCI Express specification Virtual machines (may also referred to as guest operating systems) (or VMs) 212A-212N are presented by VIL 202 on a computing system, similar to host system 102, described above in detail. In one embodiment, the virtual machines may present different operating environments, for example, Windows® based, a Linux operating system, Solaris® and others. VIL 202 allocates resources for the virtual machines 212A-212N and manages physical hardware resources. VIL 202 may be executed on a same computing device as the virtual machines or at a separate computing device that may be referred to as VIL server. An example of a VIL 202 is the hypervisor layer provided by VMWare Corporation or the Hyper-V layer provided by Microsoft Corporation, without derogation of any trademark rights. It is noteworthy that different vendors may provide different virtual operating environments and the adaptive embodiments disclosed herein may be modified to accommodate the varying virtual environments.

VIL 202 executes an adapter driver 204 for interfacing with adapter 116, while each VM executes an instance of a virtual driver 213A-213N for sending and receiving information to and from adapter 116. As an example, drivers 213A, 213B, 213C may also be referred to "as emulation drivers" since they communicate via a virtual switch (Vswitch 206A). Virtual drivers 213C, 213D and 213N that communicate via an adapter interface 208 (similar to 110, FIG. 1A) may be referred to as virtual function drivers. VIL 202 may execute other device drivers depending on the shared physical resources.

Adapter 116 may include one or more physical functions (may be referred to as PFs) 221A-221N that are presented and shared among the various VMs; each PF can be configured to expose multiple virtual functions (may be referred to as VFs) 215A-215N/217A-217N, each of which can be presented to one VM. For example, physical function (PF0) 221A may expose virtual functions 215A-215N and physical function (PFn) 221N may expose VFs 217A-217N. Each physical function 221A/221N represents a set of dedicated hardware resources, for example, registers, logic and other resources in an adapter. The VMs use emulation and virtual function drivers' 213A-213N to access PF/VFs, as described below in detail.

VIL 202 also executes virtual switch 206A-206N, shown as vswitch 206A-206N (may be referred to as vswitch 206). VIL 202 uses vswitch 206A to pass traffic via PF0 (221A), and vswitch 206N to pass traffic via PFn (221N). The vswitch 206A is used by the various VMs to send and receive data via ports 130. The vswitch 206A interfaces with a virtual Ethernet bridge (VEB) 121 at the adapter 116 for routing information. VEB 121 is a virtual switching component that can be used to switch Ethernet based frames to and from VMs. Queue pairs (or "QP") 210A and 210B may be used by the VMs to interface with VEB 121 via vswitch 206A. For example, to access PF0, VM 1 212A uses QP0 (210A), while VM2 212B uses QP1 (210B) to access PF0, via vswitch 206A. VM3 212C uses QP2 (210C) to access VF1 directly via adapter interface 208. Similarly, VM4 212D access VF2 via QP3 (210D) adapter interface 208. The embodiments disclosed herein are not limited to accessing any function either through vswitch 206 and/or directly via adapter interface 208.

Figure 2B:
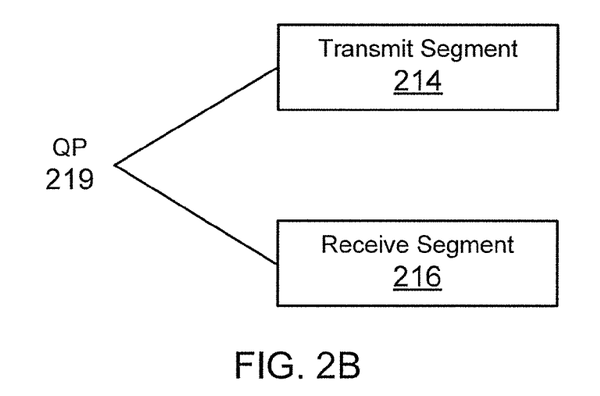
FIG. 2B shows an example of a queue pair, used according to one embodiment.

FIG. 2B shows an example of a QP 219 that may be used by the VMs of FIG. 2A to access PFs and/or VFs. QP 219 includes a transmit segment 214 and a receive segment 216. The transmit segment may be used to place data that is transmitted via adapter 116 and the receive segment 216 may be used to place information that is received. Both segments are uniquely identified. The QP may be defined for use by a physical function or a virtual function, as shown by 210A, 210B, 210C and 210D in FIG. 2A and described above.

Figure 2C:
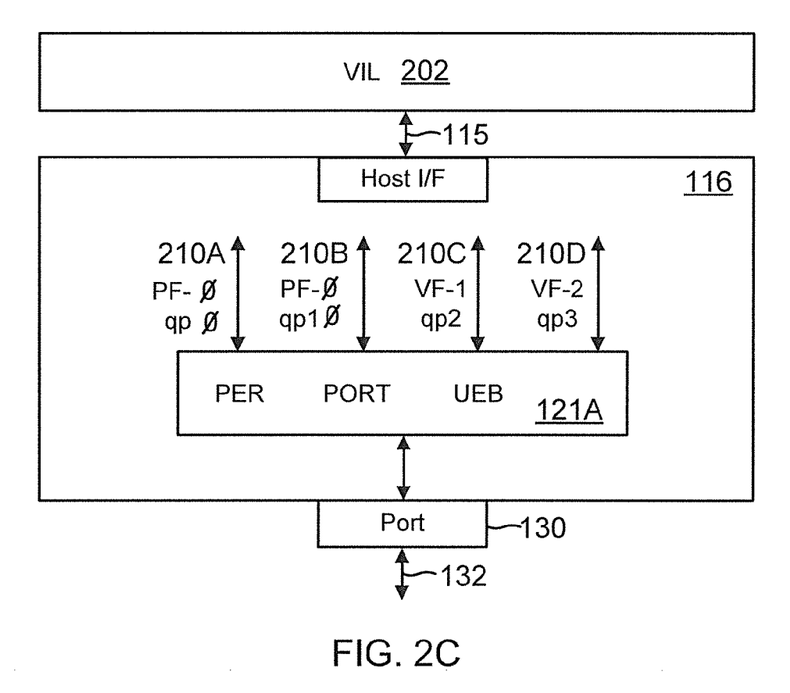
FIG. 2C-2D show conventional Virtual Ethernet Bridge (VEB) configurations.
Figure 2D:
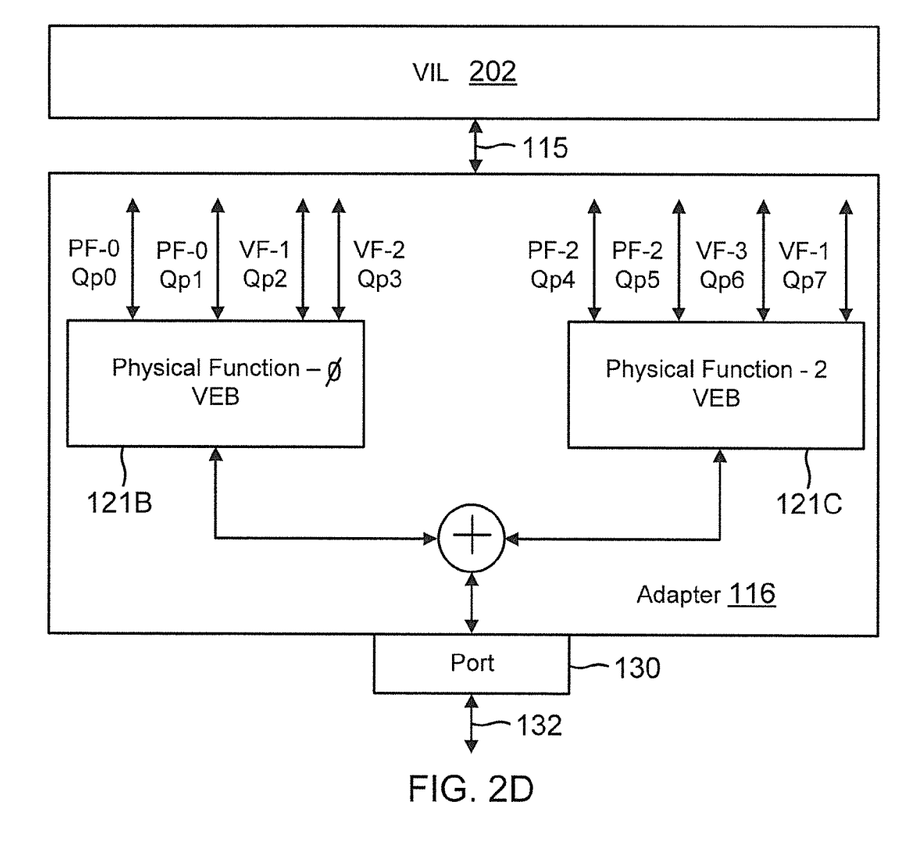

FIGS. 2C and 2D show limitations in conventional systems using VEBs 121. For example, in FIG. 2C, all PFs/VFs are hardwired to a single VEB 121A based on an associated physical port (130). VEB 121A provides virtual ports 210A-D, but all the QPs belong to the same physical function (PF0) or the associated virtual functions and thus there is no flexibility in this mechanism.

FIG. 2D shows an example, where all PFs/VFs are hardwired to a VEB based on a PF. As an example, VF1 and VF2 are children of PF0 and VF3 and VF4 are children of PF2. VEBs 121B and 121C are assigned to specific physical functions 0 and 2 respectively. Here, the QPs are owned by a specific physical function and all its virtual functions can be associated with one VEB with multiple VEBs on the port. This configuration is also undesirable because the VEBs are associated with specific physical functions. Based on the limitations of conventional systems, it is desirable to have a flexible VEB configuration, as described below with respect to the adaptive embodiments of this disclosure.

Figure 2E:
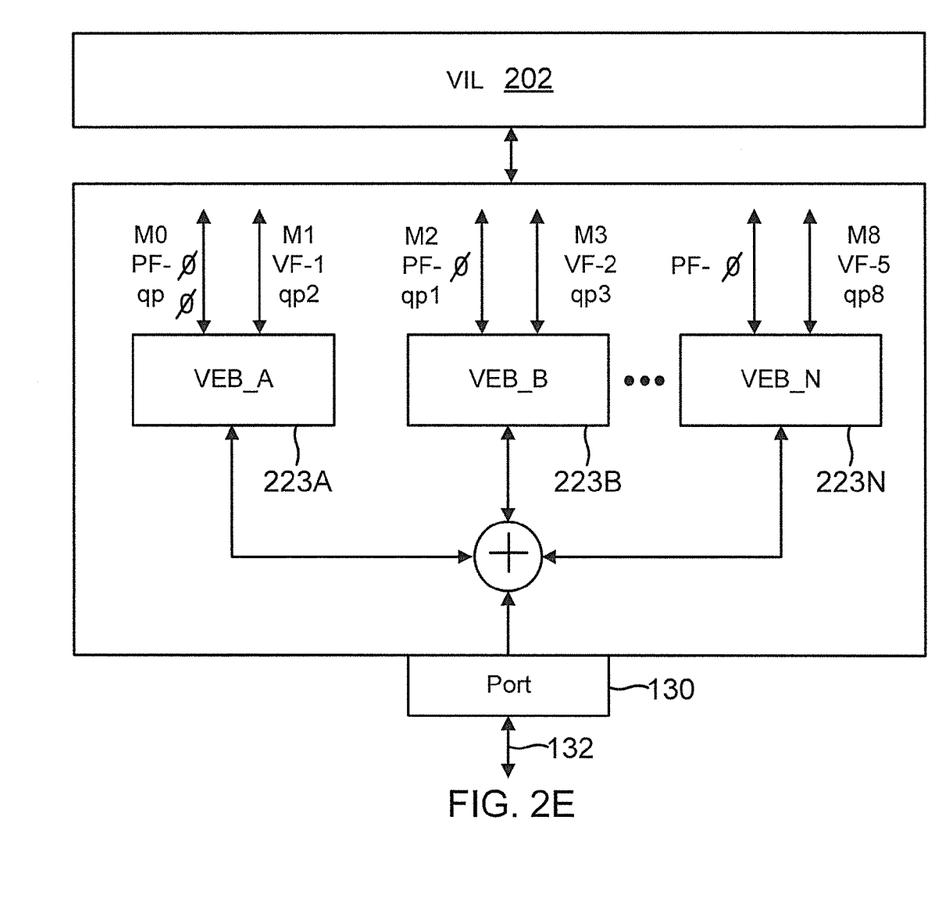
FIG. 2E shows a VEB configuration, according to one embodiment.

FIG. 2E shows an example of an embodiment of a current disclosure. In this example, multiple VEBs 223A-223N are created for the same port 130. The virtual ports of the VEBs can be flexibly associated with any QPs which are owned by any of the physical or virtual functions that are created on the port 130. The flexibility allows each VEB to switch traffic between the QPs it is associated with, and thus between the VMs that are using the QPs. Traffic between QPs not on the same VEB are forced to go in/out of port 130 and may be subject to enhanced switching rules provided by an external switch. This architecture allows flexible coexistence of VEB and external switching.

In one embodiment, each VEB is identified by a unique VEB identifier (referred to as VEB_ID) and each supports a number of virtual ports to which QPs can be associated with. Each QP is associated with one or more media control access (MAC) address, shown as M0, M1, M2 and others. The MAC address is typically used for Ethernet based communication. The VEB_ID and the MAC address can be used to route information between VMs as well as with external devices, as described below with respect to FIGS. 2F and 3-8A-8B.

Figure 2F:
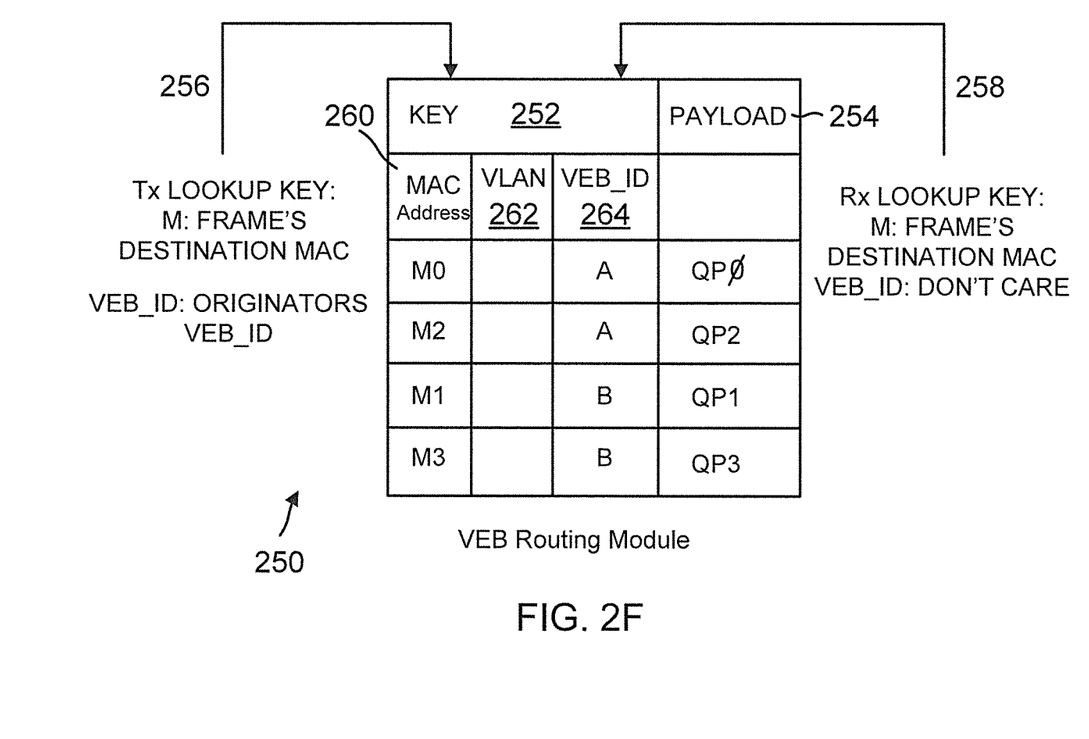
FIG. 2F shows an example of a VEB routing module, according to one embodiment.

FIG. 2F shows a routing mechanism 250 (also referred to as logic 250 or routing module 250) that may be implemented in a content addressable memory (CAM) or any other memory type, according to one embodiment. The routing mechanism 250 may be searched by a key 252. The information in the search key may be based on whether a look up is for a frame that is being transmitted or received by adapter 116. On the transmit side, the transmit lookup key 256 includes a destination MAC address (may be referred to as MAC DA) for the frame and an originator's VEB_ID. The lookup key 256 is used to obtain the appropriate QP. On the receive side, the lookup key 258 is used to obtain the QP. In this instance, the VEB_ID does not matter.

The routing mechanism 250 stores various fields. For example, the MAC address is stored in column 260, a VLAN (virtual local area network) address is stored at column 262, the VEB_ID associated with the MAC address is stored in column 264 and the payload i.e. the QP associated with the MAC address and the VEB_ID is stored in column 254.

Figure 3:
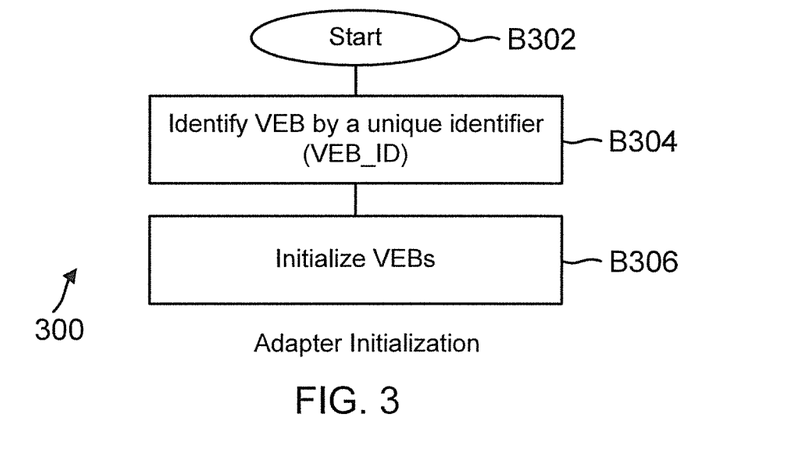

FIG. 3 shows a process 300 for initializing adapter 116 functionality, according to one embodiment. The process begins in block B300. In block B304, each VEB that can be supported by each port is identified by a unique VEB_ID. In one embodiment, the number of VEBs may be specified for each port by pre-operating system boot techniques, for example, CLP (Command Line Processing), BMC (Baseboard Management Controller), configuration parameters stored at adapter 116's non-volatile memory (for example, 122, FIG. 1A) and others. Thereafter, in block B306, the various VEBs are initialized.

Figure 4:
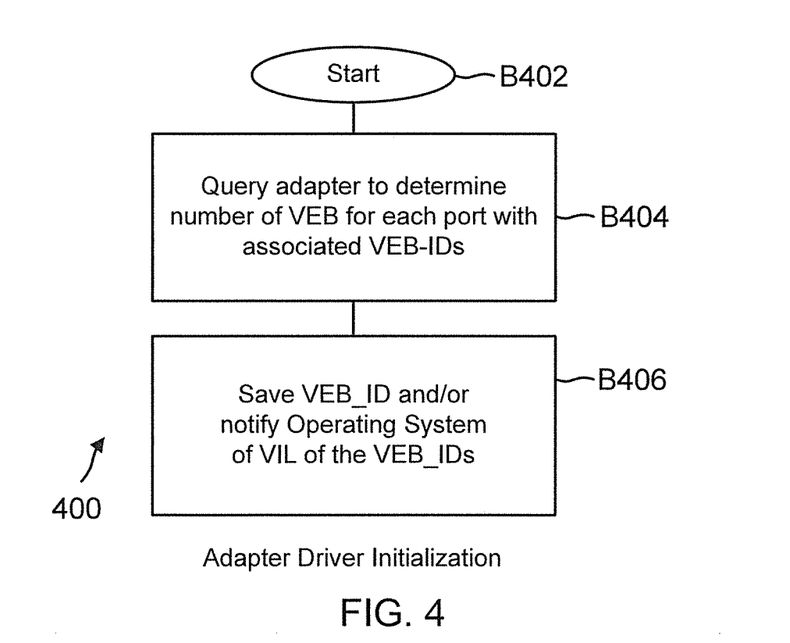

FIG. 4 shows a process flow diagram for initializing adapter driver 204, according to one embodiment. The process begins in block B402. In block B404, the adapter driver 204 sends a query to the adapter 116 to determine the number of VEBs for each port and the corresponding VEB_IDs for each port VEB. If permissible, in block B406, the adapter 204 notifies the operating system of the VEB_IDs or the adapter 204 may cache the information at a local memory (not shown) accessible to the driver and/or the operating system.

Figure 5:
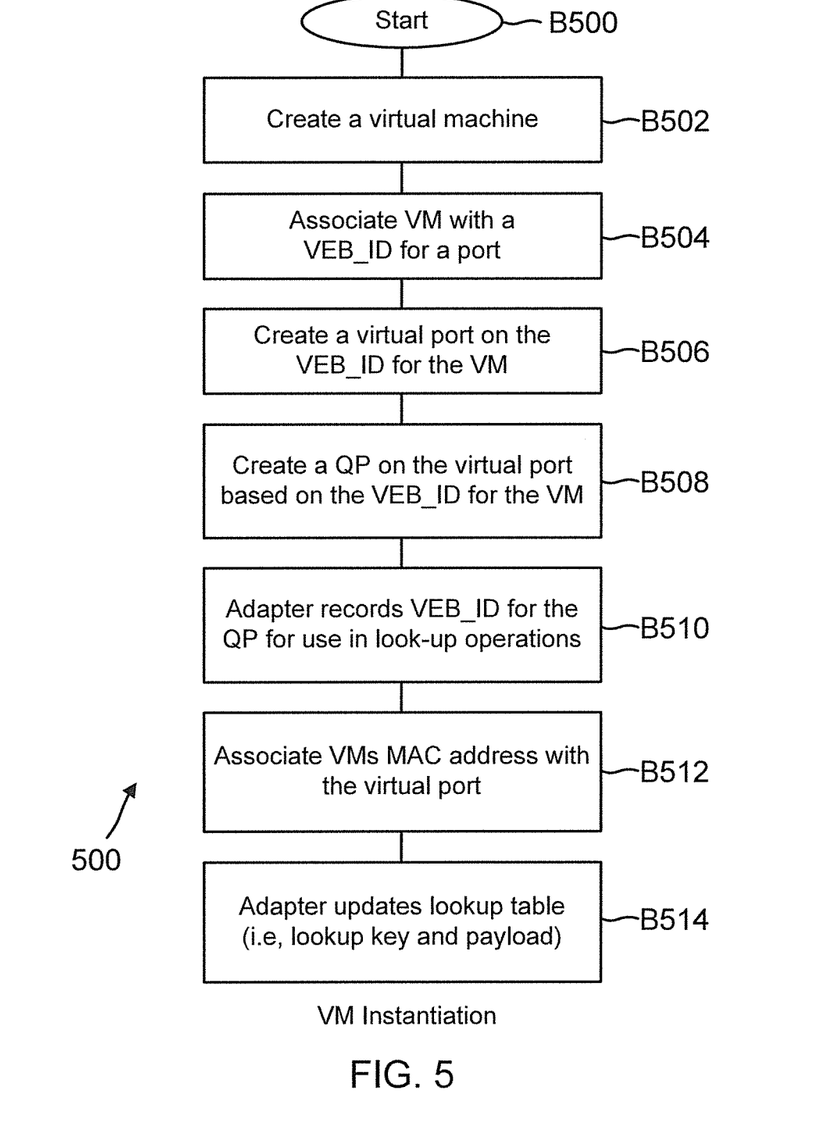

FIG. 5 shows a process 500 for VM instantiation, according to one embodiment. The process 500 begins in block B502. In block B502, a VM is created. The VM is created by VIL 202 (or any other entity) and in block B504; VIL 202 associates the VM with a VEB_ID on a port, for example, 130. In block B506, VIL 202 creates/instantiates a virtual port for the VEB_ID from block B504. In block B508, VIL 202 creates/instantiates a QP on the virtual port for the VEB_ID. Thereafter, in block B510, adapter 116 records the VEB_ID for the QP, to be subsequently used for lookup operations using the data structure of FIG. 2F. In block B512, VIL 202 associates the VM's MAC address with the virtual port for the VEB_ID. Thereafter, in block B514, the adapter updates the data structure 250 (i.e. the look-up key and the payload).

Figure 6:
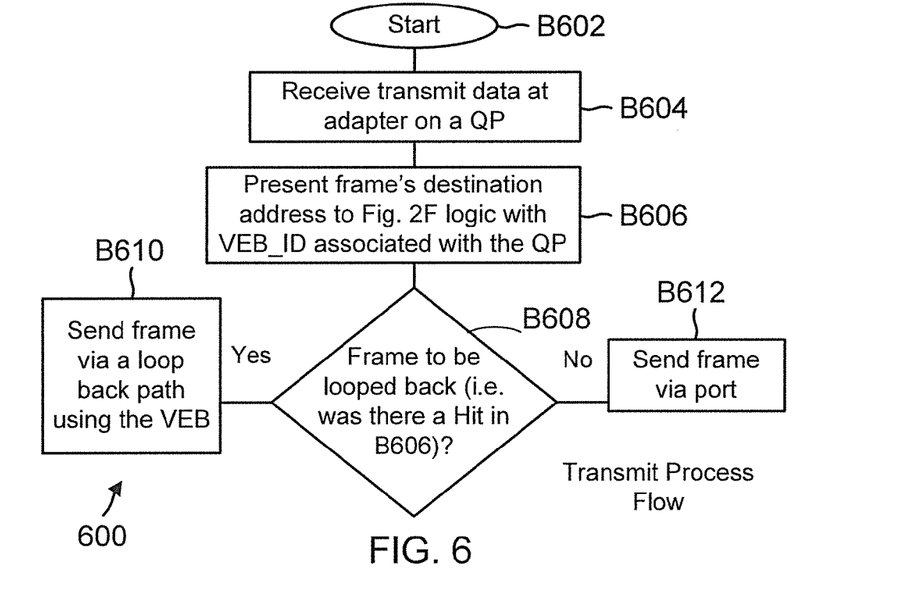

FIG. 6 shows a process 600 for transmitting information by a VM, according to one embodiment. The process begins with Block B602, when the VM attempts to transmit data using a QP/VP handle. The handle specifies the QP and the virtual port. In block B604, adapter 116 receives the transmit data request on the QP/VP handle and creates frames for transmission. In block B606, the frames are presented to logic 250 (FIG. 2F) with the VEB_ID associated with the QP on which the frames are received. A look-up operation is then performed using the VEB_ID in a look-up key. The look-up may yield a "match" or a "miss" (i.e. "no hit").

In block B608, based on whether there is a match or a miss, the VEB determines if the frames are to be "looped" back to another VM. If there is no hit (i.e. lookup misses) then the frames are to be sent out via the physical port 130 in block B612, otherwise, the frames are looped back in block B610, as described below with respect to FIGS. 7, 8A and 8B.

Figure 7:
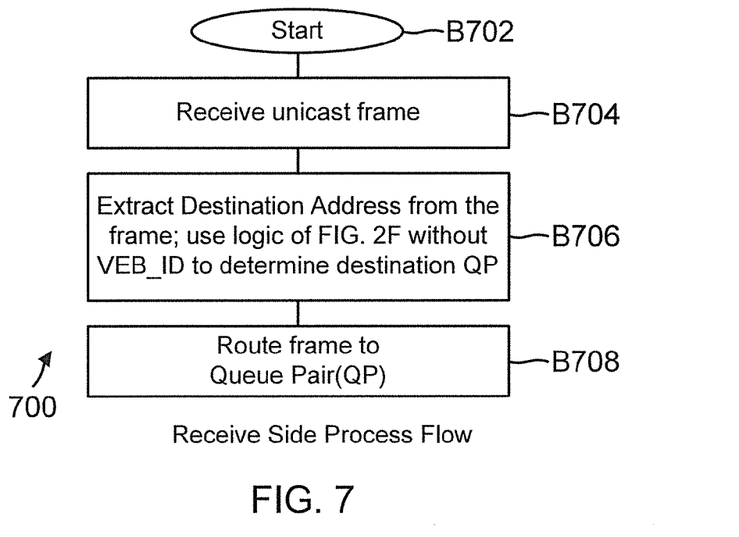

FIG. 7 shows a process 700 for receiving information at adapter 116 and routing a unicast frame with a destination address (for example, Ethernet Destination Address), according to one embodiment. The process begins in block B702, when adapter 116 is operational and ready to receive information via link 130. In block B704, a unicast frame is received at network interface 130 or from a VEB via a loop-back path (i.e. a path used for sending a frame to another VM). The term unicast means that the frame has one destination vis-á-vis a multicast frame that has multiple destinations. In block B706, the destination MAC address (MAC DA) is extracted from the frame. Logic 250 is used to perform a look-up operation to determine the destination QP. The VEB_ID is not used to determine the destination QP address. Thereafter, in block B708, the frame is routed using the QP address.

Figure 8A:
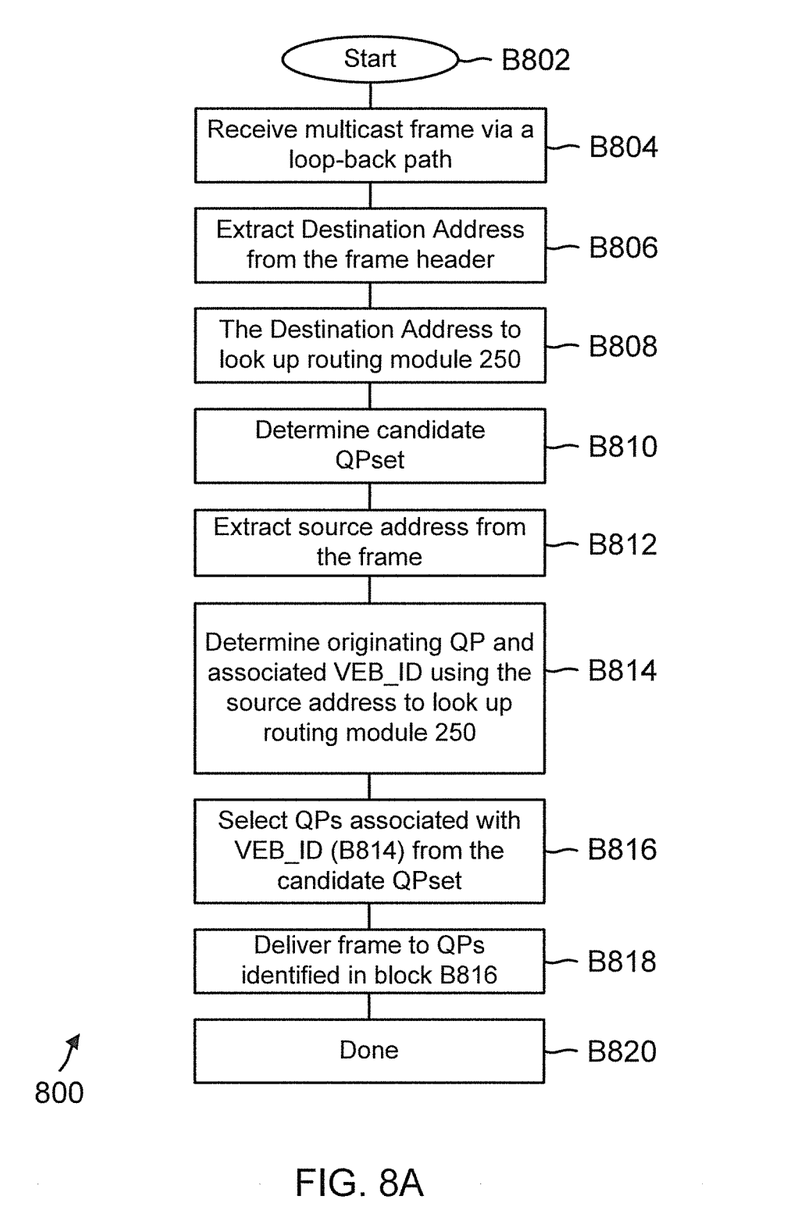

FIG. 8A shows a process 800 for handling multicast frames received via a loop-back path. The term loop-back means that the frames are received via VEBs rather than externally via port 130. The process begins in block B802, when adapter 116 and the VMs 212A-212N are operational. In block, B804, a multicast frame is received. In block B806, the destination MAC address is extracted from the frame. In block B808, the destination address is used to perform a look-up operation at logic 250. If there is a hit, then a first candidate set of QPs is obtained. The candidate set may include QPs associated with multiple VEBs.

In block B812, the source address of the frame is obtained. In block B814, a look-up operation is performed using logic 250 and the source address as one of the look-up key fields. The originating QP is first obtained and then the associated VEB_ID that was set-up in FIG. 5 is obtained.

In block B816, the candidate set from block B810 is filtered by selecting all QPs that are associated with the VEB_ID from block B814. Thereafter, the frame is delivered to the QPs from the filtered set in block B816. The process then ends in block B820.

Figure 8B:
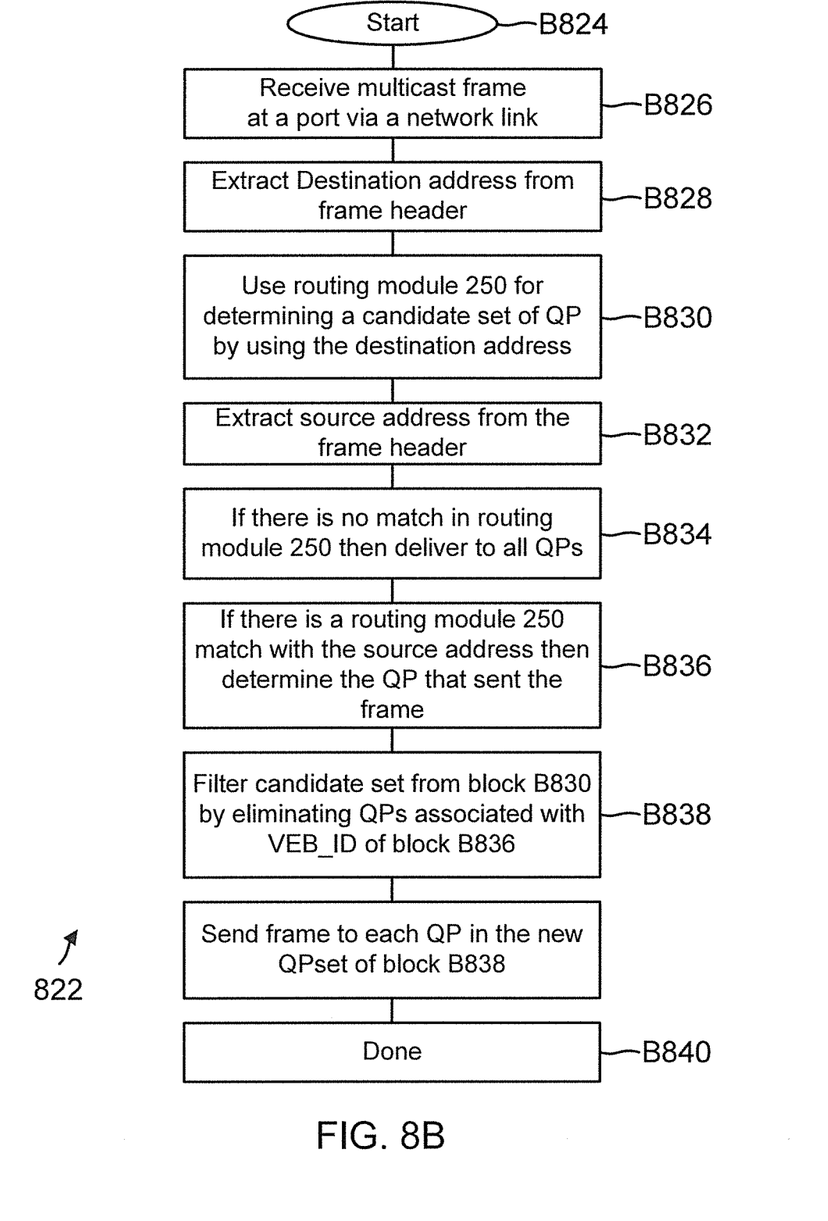

FIG. 8B shows a process 822 for handling multicast frames received via link 132 at port 130. The process begins in block B824, when adapter 116 and the VMs 212A-212N are operational. In block, B826, a multicast frame is received at port 130 via link 132. In block B828, the destination MAC address is extracted from the frame. In block B830, the destination address is used to perform a look-up operation at logic 250 without using a VEB_ID. If there is a hit, then a first candidate set of QPs is obtained.

In block B832, the source address of the frame is obtained. In block B834, a look-up operation is performed using logic 250 with the source address as one of the look-up key fields without using the VEB_ID. If there is no match, then the frame is delivered to all the candidate QPs.

If there is a match, then in block B836, the originating QP is determined. The VEB-ID associated with the originating QP is also determined. In block B838, the candidate set from block B830 is filtered by eliminating all QPs associated with the VEB_ID determined in block B836. Thereafter, the frame is delivered to the QPs from the filtered set in block B838. The process then ends in block B840.

The foregoing methods and systems have various advantages. For example, one is able to assign VEBs regardless of PFs and/or VFs. The routing module with the VEB_IDs is used to route frames regardless of how the VEBs are configured or assigned.

The above description presents the best mode contemplated for carrying out the present embodiments, and of the manner and process of making and using them, in such full, clear, concise, and exact terms as to enable any person skilled in the art to which they pertain to make and use these embodiments. These embodiments are, however, susceptible to modifications and alternate constructions from that discussed above that are fully equivalent. For example, the embodiments disclosed herein are applicable to any peripheral device and are not limited to any particular adapter type. Consequently, these embodiments are not limited to the particular embodiments disclosed. On the contrary, these embodiments cover all modifications and alternate constructions coming within the spirit and scope of the embodiments as generally expressed by the following claims, which particularly point out and distinctly claim the subject matter of the embodiments.

What is claimed is:

1. A device coupled to a computing system for receiving information from another device and transmitting information to the other device via a network link, comprising:

a plurality of virtual bridges assigned to a physical port of the device that is connected to the network link for sending and receiving information, where each virtual bridge is uniquely identified by a virtual bridge identifier and is associated with a virtual port; wherein each virtual port is associated with a queue pair that is assigned to any physical or virtual function of the device such that each virtual bridge switches traffic between queue pairs and a plurality of virtual machines using the queue pairs for sending and receiving information; and a routing module using a data structure for storing destination addresses for the plurality of virtual machines, virtual bridge identifiers associated with the plurality of virtual bridges and a queue pair associated with each virtual bridge identifier; and wherein to process a frame, the routing module data structure is used to determine whether the frame is sent by the other device or one of the virtual machines for transmission to another virtual machine from among the plurality of virtual machines; and wherein to transmit the frame, a destination address and a virtual bridge identifier are used to ascertain a queue pair for the frame; and when the frame is received from the other device, then the queue pair is obtained using destination address in the frame without using the virtual bridge identifier.

2. The device of claim 1, wherein the virtual bridge is Virtual Ethernet Bridge (VEB).

3. The device of claim 2, wherein the VEB can be assigned to any physical or virtual function and queue pair supported by the device.

4. The device of claim 1, wherein the device is a PCI-Express device that is coupled to a computing system via a PCI-Express link.

5. The device of claim 1, wherein the routing module stores a look-up data structure in a ternary content addressable memory.

6. The device of claim 1, wherein the device is an adapter for processing input/output requests.

7. The device of claim 1, wherein the device is a network adapter for sending and receiving network information.

8. A method comprising:

assigning a plurality of virtual bridges to a physical port of a network device that is connected to a network link for sending and receiving information to and from another device, where each virtual bridge is uniquely identified by a virtual bridge identifier and is associated with a virtual port; wherein each virtual port is associated with a queue pair that is assigned to any physical or virtual function of the network device such that each virtual bridge switches traffic between queue pairs and a plurality of virtual machines using the queue pairs for sending and receiving information storing destination addresses at a routing module data structure for the plurality of virtual machines virtual bridge identifiers associated with the plurality of virtual bridges of the network device and a queue pair associated with each virtual bridge identifier;

using the routing module data structure to determine whether a frame is sent by another device or one of the plurality of virtual machines for transmission to another virtual machine; wherein to transmit the frame, a destination address and a virtual bridge identifier are used to ascertain a queue pair for the frame; and when the frame is received from the other device, then the queue pair is obtained using destination address in the frame without using the virtual bridge identifier.

9. The method of claim 8, wherein the virtual bridge is Virtual Ethernet Bridge (VEB).

10. The method of claim 9, wherein the VEB can be assigned to any physical or virtual function and queue pair supported by the device.

11. The method of claim 8, wherein the network device is a PCI-Express device that is coupled to a computing system via a PCI-Express link.

12. The method of claim 8, wherein the routing module stores a look-up data structure in a ternary content addressable memory.

13. The method of claim 8, wherein the network device is an adapter for processing input/output requests.

14. The method of claim 8, wherein the network device is a network adapter for sending and receiving network information.

15. A non-transitory, machine readable storage medium, storing executable instructions, which when executed by a machine, causes the machine to perform a method, the method comprising:

assigning a plurality of virtual bridges to a physical port of a network device that is connected to a network link for sending and receiving information to and from another device, where each virtual bridge is uniquely identified by a virtual bridge identifier and is associated with a virtual port; wherein each virtual port is associated with a queue pair that is assigned to any physical or virtual function of the network device such that each virtual bridge switches traffic between queue pairs and a plurality of virtual machines using the queue pairs for sending and receiving information storing destination addresses at a routing module data structure for the plurality of virtual machines virtual bridge identifiers associated with the plurality of virtual bridges of the network device and a queue pair associated with each virtual bridge identifier;

using the routing module data structure to determine whether a frame is sent by another device or one of the plurality of virtual machines for transmission to another virtual machine; wherein to transmit the frame, a destination address and a virtual bridge identifier are used to ascertain a queue pair for the frame; and when the frame is received from the other device, then the queue pair is obtained using destination address in the frame without using the virtual bridge identifier.

16. The storage medium of claim 15, wherein the virtual bridge is Virtual Ethernet Bridge (VEB).

17. The storage medium of claim 16, wherein the VEB can be assigned to any physical or virtual function and queue pair supported by the device.

18. The storage medium of claim 15, wherein the network device is a PCI-Express device that is coupled to a computing system via a PCI-Express link.

19. The storage medium of claim 15, wherein the routing module stores a look-up data structure in a ternary content addressable memory.

20. The storage medium of claim 15, wherein the network device is an adapter for processing input/output requests.

21. The storage medium of claim 15, wherein the network device is a network adapter for sending and receiving network information.

* * * * *